(12) United States Patent
Dumitru et al.

(10) Patent No.: US 9,448,655 B2
(45) Date of Patent: Sep. 20, 2016

(54) TOUCH SENSOR AND METHODS OF MAKING SAME

(71) Applicant: Honeywell International Inc., Morristown, NJ (US)

(72) Inventors: Viorel Georgel Dumitru, Prahova (RO); Stefan Dan Costea, Bucharest (RO); Ion Georgescu, Bucharest (RO); Mihai Brezeanu, Bucharest (RO); Bogdan-Catalin Serban, Bucharest (RO)

(73) Assignee: Honeywell International Inc., Morris Plains, NJ (US)

( * ) Notice: Subject to any disclaimer, the term of this patent is extended or adjusted under 35 U.S.C. 154(b) by 170 days.

(21) Appl. No.: 14/333,193

(22) Filed: Jul. 16, 2014

(65) Prior Publication Data

US 2015/0022491 A1    Jan. 22, 2015

(30) Foreign Application Priority Data

Jul. 16, 2013    (EP) .................................. 13176756

(51) Int. Cl.
| G06F 3/045 | (2006.01) |
| G06F 3/041 | (2006.01) |
| G06F 3/044 | (2006.01) |
| G06F 3/0354 | (2013.01) |

(52) U.S. Cl.
CPC ......... *G06F 3/0412* (2013.01); *G06F 3/03545* (2013.01); *G06F 3/044* (2013.01); *G06F 3/0414* (2013.01); *G06F 2203/04106* (2013.01)

(58) Field of Classification Search
CPC .................................................. G06F 3/0412
USPC ........................................................ 345/174
See application file for complete search history.

(56) References Cited

U.S. PATENT DOCUMENTS

| 2009/0309616 | A1 | 12/2009 | Klinghult et al. | |
| 2011/0049579 | A1* | 3/2011 | Dumitru | B82Y 10/00 257/254 |
| 2011/0227836 | A1 | 9/2011 | Li et al. | |
| 2013/0082970 | A1* | 4/2013 | Frey | G06F 3/0414 345/173 |
| 2014/0210313 | A1* | 7/2014 | Kim | H01L 41/113 310/339 |

FOREIGN PATENT DOCUMENTS

| CN | 104298393 A | 1/2015 |
| EP | 1330779 B1 | 12/2009 |
| EP | 2274667 A1 | 1/2011 |
| EP | 2133777 B1 | 10/2011 |
| WO | WO-2012173305 A1 | 12/2012 |
| WO | WO-2013093327 A1 | 6/2013 |

OTHER PUBLICATIONS

"European Application Serial No. 13176756.8, European Search Report mailed Dec. 5, 2013", 3 pgs.
"European Application Serial No. 13176756.8, Office Action mailed Dec. 20, 2013", 5 pgs.
"European Application Serial No. 13176756.8, Response filed May 12, 2014 to Office Action mailed Dec. 20, 2013", 15 pgs.

* cited by examiner

*Primary Examiner* — Jason Olson
(74) *Attorney, Agent, or Firm* — Schwegman Lundberg & Woessner, P.A.

(57) ABSTRACT

The present disclosure relates to a touch sensor and touch sensitive display having a plurality of first and second conductive lines arranged substantially orthogonally with a sensing material to sense a change in capacitance between them. The first and second conductive lines and the sensing material defining an array of sensitive transistors.

14 Claims, 8 Drawing Sheets

TOUCH SENSOR AND METHODS OF MAKING SAME

CROSS REFERENCE TO RELATED APPLICATIONS

This application claims the benefit of priority under 35 U.S.C. Section 119 to European Patent Application Serial No. 13176756.8, filed on Jul. 16, 2013, which application is incorporated herein by reference in its entirety.

FIELD OF THE INVENTION

The present disclosure relates to touch sensors and methods for making same. More particularly, the disclosure relates to a touch sensor that utilizes semiconductor and piezoelectric materials.

BACKGROUND

Touch sensors are a component of touch-sensitive displays that are widely used in smart phones, tablet computers and portable game machines. Existing touch sensors may be based on resistive, capacitive, acoustic or optical touch sensing technologies. Each of these technologies have limitations such as, for example, no or limited multi-touch capabilities, limited sensitivity, complicated detection algorithms or a lack of user-friendliness.

There is therefore a need in the art for touch sensors that do not suffer from some of these drawbacks. The embodiments of the present invention address this need.

SUMMARY

A touch sensor includes first conductive lines, second conductive lines, and a sensing material between the first conductive lines and the second conductive lines to sense a change in capacitance between the first conductive lines and the second conductive lines and to sense a force applied to the sensing material.

A method includes forming first conductive lines, forming second conductive lines, and forming a sensing material between the first conductive lines and the second conductive lines, the sensing material to sense a force applied to the sensing material and to sense a change in capacitance between the first conductive lines and the second conductive lines.

In still another embodiment, a touch-sensitive display includes a display and a touch sensor in the display, the touch sensor including first conductive lines, second conductive lines, and a sensing material between the first conductive lines and the second conductive lines, the sensing material to sense a force applied to the sensing material and to sense a change in capacitance between the first conductive lines and the second conductive lines.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Figure 1A:
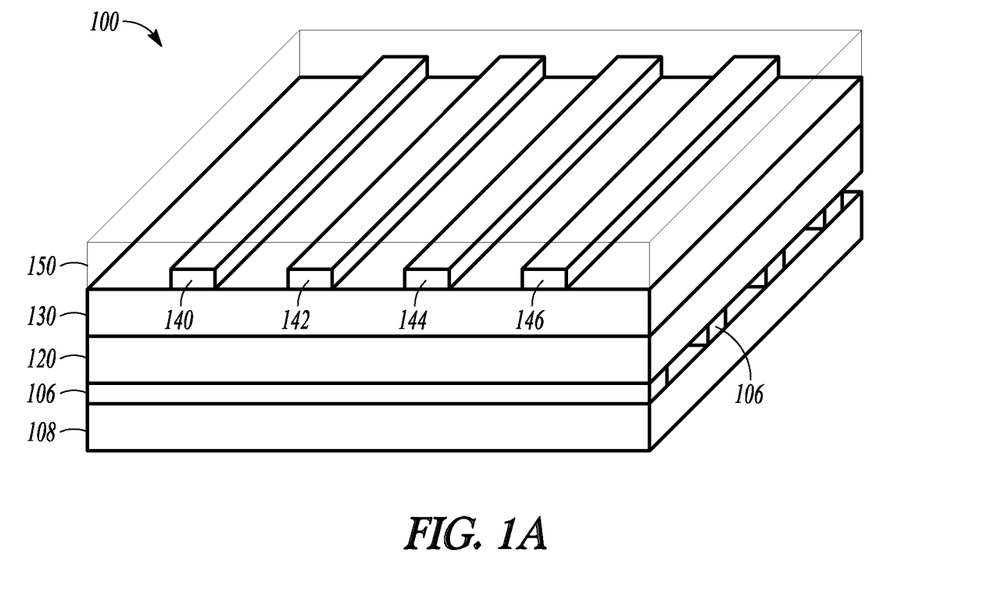
FIG. 1A is an oblique view of a touch sensor according to an example embodiment.

FIG. 1A is an oblique view of a touch sensor indicated generally at 100 according to an example embodiment. A number of first conductive traces or lines 106 may be formed on a substrate 108 in a first direction. A piezoelectric layer 120 may be formed on the first conductive lines 106 and a semiconductor layer 130 may be formed on the piezoelectric layer 120. A number of second conductive traces or lines 140, 142, 144 and 146 may be formed over the semiconductor layer 130 in a second direction that is substantially orthogonal to the first direction. The first conductive lines 106 and the second conductive lines 140, 142, 144 and 146 can form a grid of conductive lines when viewed from the top of the touch sensor 100. A dielectric layer 150 may be formed over the second conductive lines 140, 142, 144 and 146 and the semiconductor layer 130.

A location of a conductor (such as a human finger) near the first conductive lines 106 or the second conductive lines 140, 142, 144 and 146 may be sensed when current is flowing through the lines 106, 140, 142, 144 and 146. The conductor changes a capacitance between one of the first conductive lines 106 and one of the second conductive lines 140, 142, 144 and 146 which may be sensed by sense circuitry (not shown). The grid of the first conductive lines 106 and the second conductive lines 140, 142, 144 and 146 defines an array of sensitive transistors.

The piezoelectric layer 120 can sense an applied force. When stressed by a force applied to the touch sensor 100, the piezoelectric layer 120 generates electric charge that modulates the current flowing through the semiconductor layer 130 and the second conductive lines 140, 142, 144 and 146. The modulated current can be sensed by the sense circuitry (not shown).

Figure 1B:
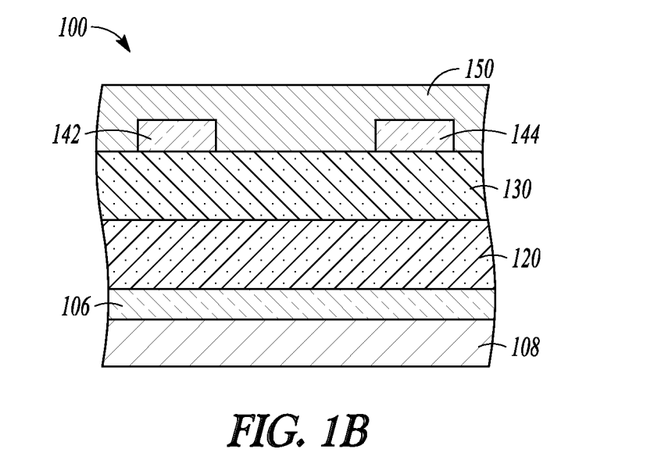
FIG. 1B is a front view of a portion of the example touch sensor of FIG. 1A according to an example embodiment.

FIG. 1B is a front view of a portion of the example touch sensor 100 of FIG. 1A illustrating one of the transistors according to an example embodiment. The front view of FIG. 1B includes one of the first conductive lines 106 that is a gate of a transistor. The second conductive line 142 is a source, the second conductive line 144 is a drain, and the semiconductor layer 130 is a channel of the transistor.

Figure 2:
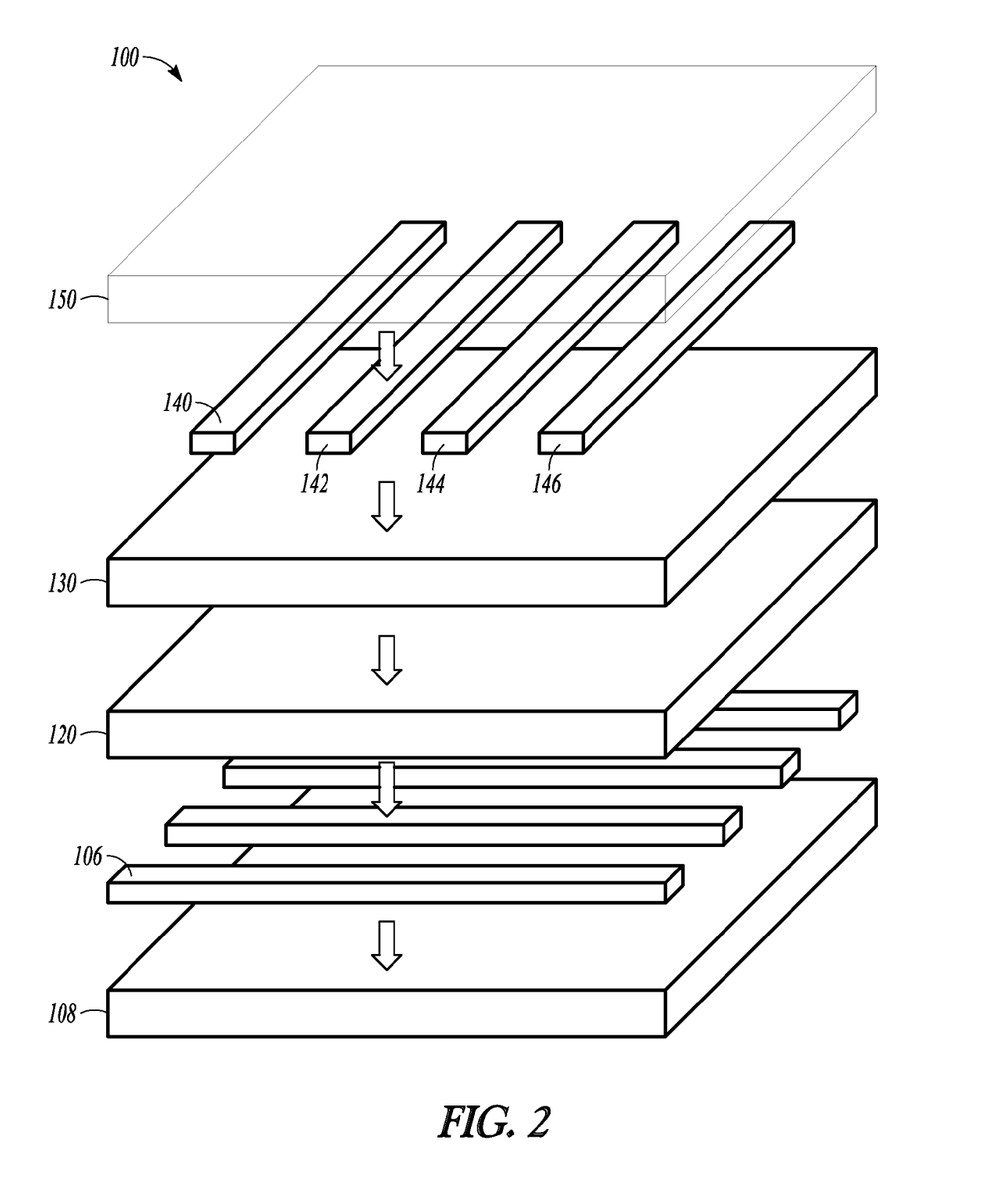
FIG. 2 is an exploded view of the example touch sensor of FIG. 1A according to an example embodiment.

FIG. 2 is an exploded view of the example touch sensor 100 of FIG. 1A according to an example embodiment to illustrate the formation of the touch sensor 100. The first conductive lines 106 may be deposited on the substrate 108 which is transparent. The substrate 108 may comprise indium tin oxide over polyethylene terephthalate (ITOPET). The first conductive lines 106 may be obtained by patterning the indium tin oxide (ITO) in the ITOPET.

The piezoelectric layer 120 may be transparent and comprise AlN deposited by sputtering. The semiconductor layer 130 may be transparent and comprise ZnO, InGaZnO, Al(x)In(1−x)N or thin InN deposited by sputtering. The semiconductor layer 130 may also comprise carbon nanotubes or nanowires formed by printing. The second conductive lines 140, 142, 144 and 146 may be deposited on the semiconductor layer 130 and the dielectric layer 150 may be formed over the second conductive lines 140, 142, 144 and 146 and the semiconductor layer 130. The second conductive lines 140, 142, 144 and 146 may comprise ITO and the dielectric layer 150 may comprise silicon dioxide.

Figure 3A:
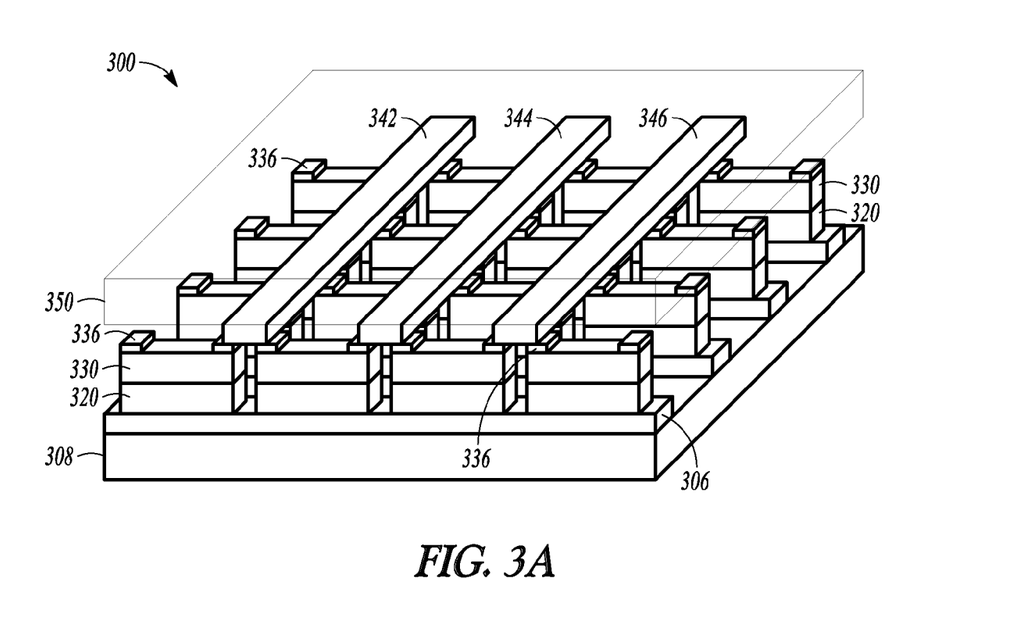
FIG. 3A is an oblique view of a touch sensor according to an example embodiment.

FIG. 3A is an oblique view of a touch sensor indicated generally at 300 according to an example embodiment. A number of first conductive traces or lines 306 may be formed on a substrate 308 in a first direction. A number of blocks of piezoelectric material 320 may be formed on the first conductive lines 306 and a block of semiconductor material 330 may be formed on each respective block of piezoelectric material 320. Two electrical contacts 336 may be formed on each of the blocks of semiconductor material 330, one at each end of each block of semiconductor material 330. A number of second conductive traces or lines 342, 344 and 346 may be formed over the blocks of semiconductor material 330 in a second direction that is substantially orthogonal to the first direction. The first conductive lines 306 and the second conductive lines 342, 344 and 346 can form a grid of conductive lines when viewed from the top of the touch sensor 300. A dielectric layer 350 may be formed over the second conductive lines 342, 344 and 346 and the blocks of semiconductor material 330.

In a manner analogous to the operation of the touch sensor 100 described above, a location of a conductor (such as a human finger) near the first conductive lines 306 or the second conductive lines 342, 344 and 346 may be sensed. The conductor changes a capacitance between one of the first conductive lines 306 and one of the second conductive lines 342, 344 and 346 which may be sensed by sense circuitry (not shown) when current is flowing through the lines 306, 342, 344 and 346. The grid of the first conductive lines 306 and the second conductive lines 342, 344 and 346 can define an array of sensitive transistors in the touch sensor 300.

The blocks of piezoelectric material 320 can sense an applied force. When stressed by a force applied to the touch sensor 300, the closest block of piezoelectric material 320 generates electric charge that modulates the current flowing through the block of semiconductor material 330 above the block of piezoelectric material 320 and the nearby pair of second conductive lines 342, 344 and 346. The modulated current can be sensed by the sense circuitry (not shown).

Figure 3B:
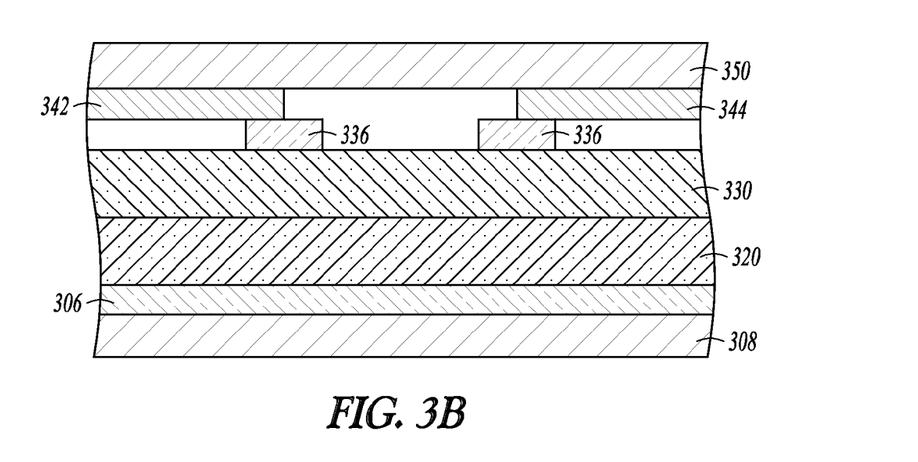
FIG. 3B is a front view of a portion of the example touch sensor of FIG. 3A according to an example embodiment.

FIG. 3B is a front view of a portion of the example touch sensor 300 of FIG. 3A illustrating one of the transistors according to an example embodiment. The front view of FIG. 3B includes one of the first conductive lines 306 that is a gate of a transistor. The second conductive line 342 is a source that is electrically coupled to the block of semiconductor material 330 through a first one of the electrical contacts 336. The second conductive line 344 is a drain that is electrically coupled to the block of semiconductor material 330 through a second one of the electrical contacts 336. The block of semiconductor material 330 is a channel of the transistor. The transistors in the touch sensor 300 are physically separated from each other in contrast to the transistors in the example touch sensor 100 of FIG. 1A.

Figure 4:
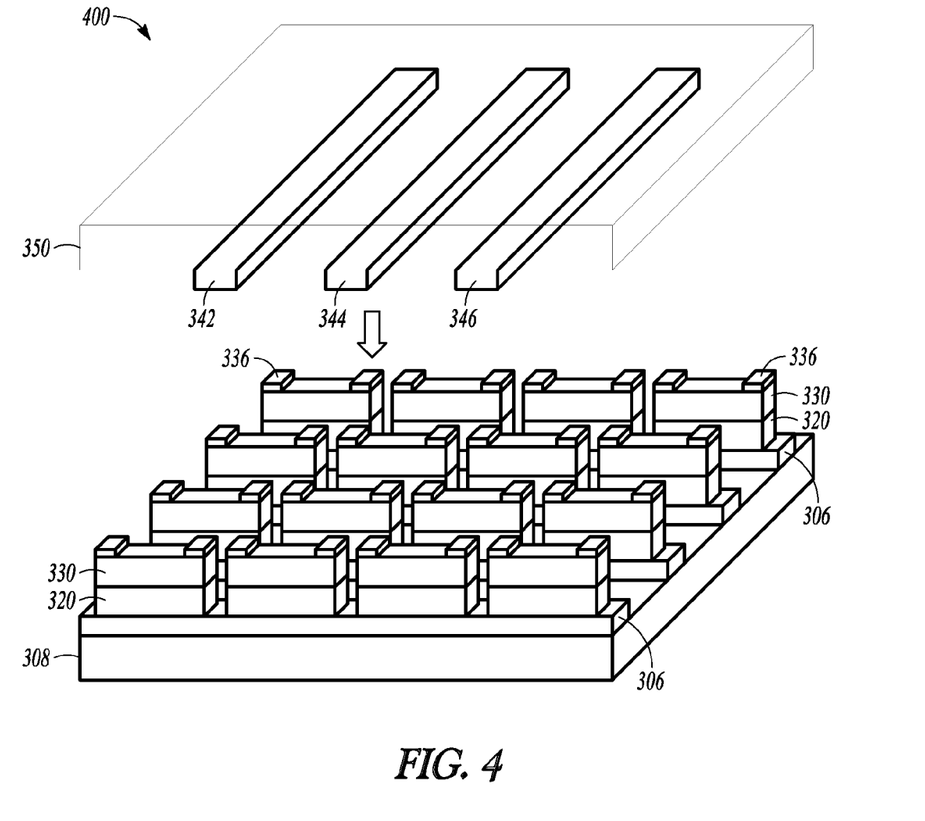
FIG. 4 is an exploded view of the example touch sensor of FIG. 3A according to an example embodiment.

FIG. 4 is an exploded view of the example touch sensor 300 of FIG. 3A according to an example embodiment to illustrate the formation of the touch sensor 300. The first conductive lines 306 may be deposited on the substrate 308 which is transparent. The substrate 308 may comprise ITO-PET. The first conductive lines 306 may be obtained by patterning the ITO.

The blocks of piezoelectric material 320 may be transparent and comprise AlN. The blocks of semiconductor material 330 may be transparent and comprise ZnO, InGaZnO, Al(x)In(1−x)N or thin InN. The blocks of piezoelectric material 320 and the blocks of semiconductor material 330 may be deposited by sputtering on selected areas of the first conductive lines 306 using a mask. The blocks of semiconductor material 330 may also comprise carbon nanotubes or nanowires formed by printing. The electrical contacts 336 are deposited on either end of each block of semiconductor material 330 using a mask.

The second conductive lines 342, 344 and 346 may be pre-patterned on the dielectric layer 350, and the dielectric layer 350 with the second conductive lines 342, 344 and 346 may be bonded to the elements described above such that the second conductive lines 342, 344 and 346 are in contact with the electrical contacts 336. The dielectric layer 350 is located over the second conductive lines 342, 344 and 346 and the blocks of semiconductor material 330. The second conductive lines 342, 344 and 346 may comprise ITO and the dielectric layer 350 may comprise silicon dioxide.

Figure 5A:
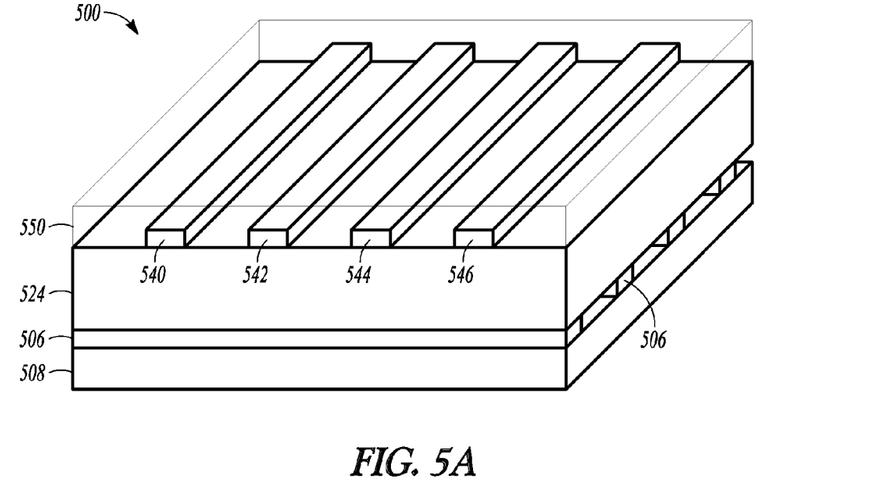
FIG. 5A is an oblique view of a touch sensor according to an example embodiment.

FIG. 5A is an oblique view of a touch sensor indicated generally at 500 according to an example embodiment. A number of first conductive traces or lines 506 may be formed on a substrate 508 in a first direction. A combined layer 524 that has both piezoelectric and semiconductor properties may be formed on the first conductive lines 506. A number of second conductive traces or lines 540, 542, 544 and 546 may be formed over the combined layer 524 in a second direction that is substantially orthogonal to the first direction. The first conductive lines 506 and the second conductive lines 540, 542, 544 and 546 can form a grid of conductive lines when viewed from the top of the touch sensor 500. A dielectric layer 550 may be formed over the second conductive lines 540, 542, 544 and 546 and the combined layer 524.

A location of a conductor (such as a human finger) near the first conductive lines 506 or the second conductive lines 540, 542, 544 and 546 may be sensed when current is flowing through the lines 506, 540, 542, 544 and 546. The conductor changes a capacitance between one of the first conductive lines 506 and one of the second conductive lines 540, 542, 544 and 546 which may be sensed by sense circuitry (not shown). The grid of the first conductive lines 506 and the second conductive lines 540, 542, 544 and 546 defines an array of sensitive transistors.

The combined layer 524 can sense an applied force. When stressed by a force applied to the touch sensor 500, the combined layer 524 generates electric charge that modulates the current flowing through the first conductive lines 506 and the second conductive lines 540, 542, 544 and 546. The modulated current can be sensed by the sense circuitry (not shown).

Figure 5B:
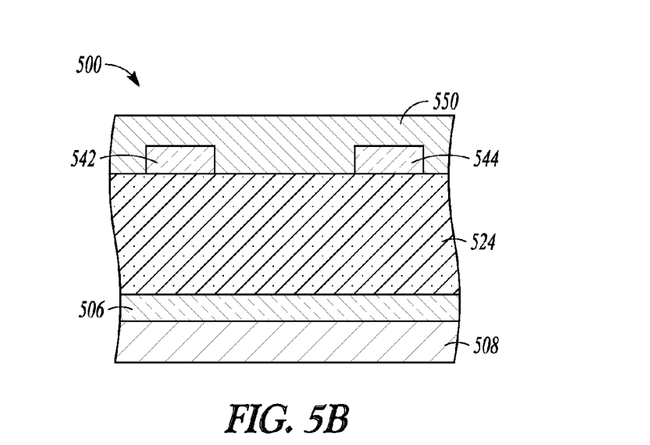
FIG. 5B is a front view of a portion of the example touch sensor of FIG. 5A according to an example embodiment.

FIG. 5B is a front view of a portion of the example touch sensor 500 of FIG. 5A illustrating one of the transistors according to an example embodiment. The front view of FIG. 5B includes one of the first conductive lines 506 that is a gate of a transistor. The second conductive line 542 is a source, the second conductive line 544 is a drain, and the combined layer 524 is a channel of the transistor.

The touch sensor 500 may be formed in a manner analogous to the formation of the touch sensor 100 described above with reference to FIG. 2. Instead of forming the piezoelectric layer 120 and the semiconductor layer 130, the combined layer 524 may be formed. The combined layer 524 may be transparent and may comprise ZnO, GaN, InN or AlInN that may be deposited by sputtering. The substrate 508 may comprise ITOPET. The first conductive lines 506 and the second conductive lines 540, 542, 544 and 546 may comprise ITO. The dielectric layer 150 may comprise silicon dioxide.

Figure 6:
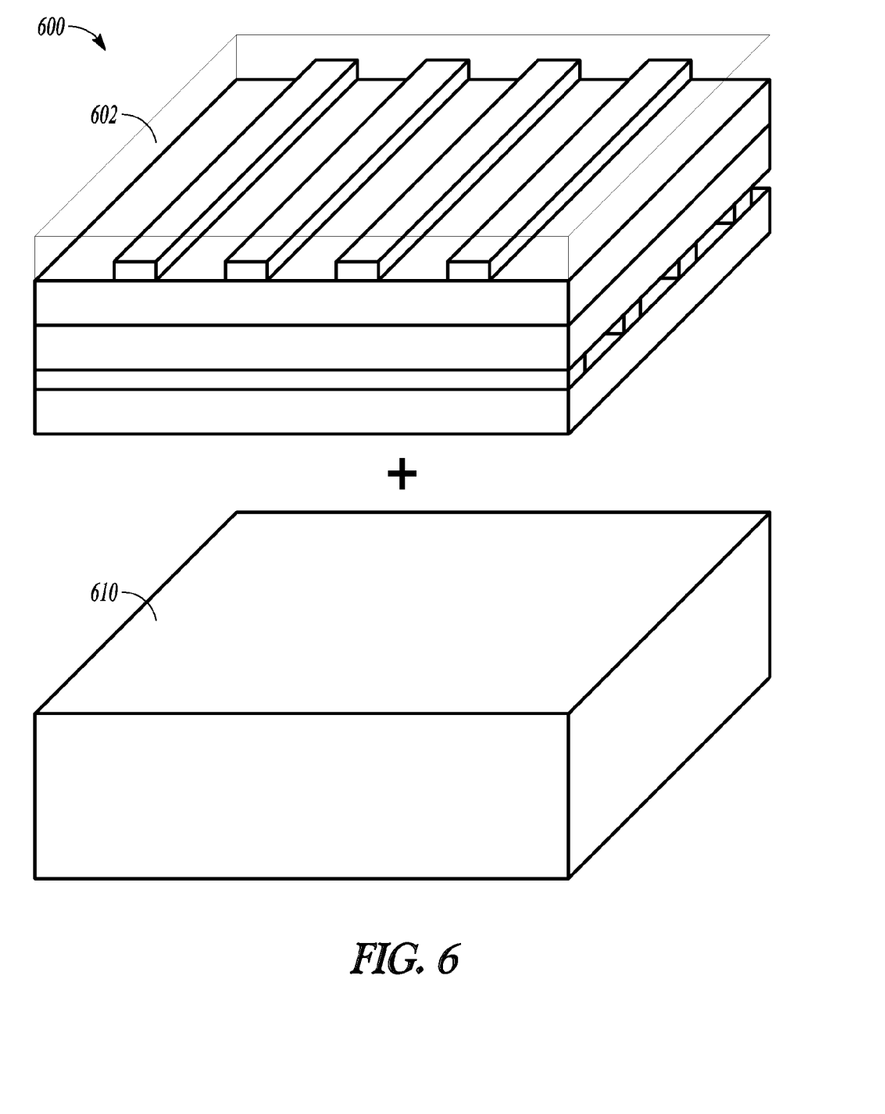
FIG. 6 is an exploded view of a touchscreen according to an example embodiment.

FIG. 6 is an exploded view of a touch-sensitive display indicated generally at 600 according to an example embodiment. A touch sensor 602 is located on a display 610. The touch sensor 602 may be any one of the touch sensors 100, 300 or 500 shown in the figures and described above. The display 610 may be a liquid-crystal display (LCD) or an organic light-emitting diode (OLED) display according to an example embodiment.

Figure 7:
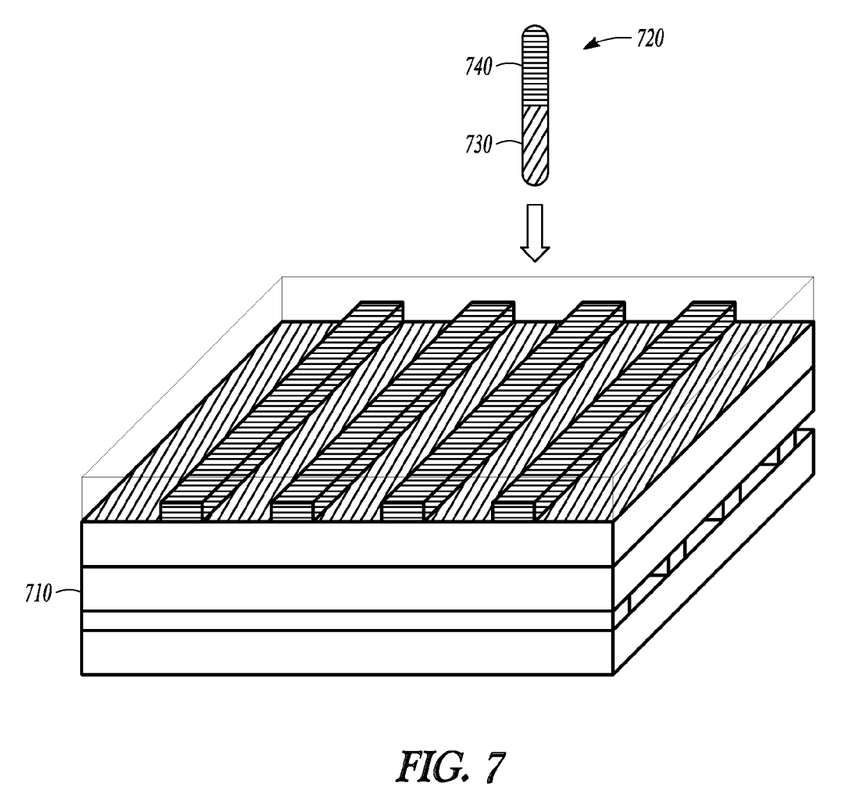
FIG. 7 is an oblique view of a touch sensor and a pen according to an example embodiment.

FIG. 7 is an oblique view of a touch sensor 710 and a pen indicated generally at 720 according to an example embodiment. The touch sensor 710 may be any one of the touch sensors 100, 300 or 500 shown in the figures and described above that can detect two different control actions. The pen 720 may comprise a writing portion 730 and an erasing portion 740. The writing portion 730 is electrically conductive and may be detected by capacitive sensing in the touch sensor 710. The writing portion 730 may be used to write on a touch screen including the touch sensor 710. The erasing portion 740 is an electrical insulator that may not be detected by capacitive sensing. The erasing portion 740 may be sharper and more rigid than the writing portion 730 and an application of the erasing portion 740 with force to the touch sensor 710 may be detected by piezoelectric sensing in the touch sensor 710. The writing portion 730 may be used for writing, and the erasing portion 740 may be used for erasing. Alternatively, the writing portion 730 is an electrical insulator that may be used to write via the piezoelectric sensing and the erasing portion 740 is electrically conductive and may be used to erase via the capacitive sensing. Sense circuitry may distinguish between different levels of force applied to the touch sensor 710 by the pen 720 and trigger different functions in response. Alternatively, the pen 720 may be an electrical insulator that may be used to write via the piezoelectric sensing while an erase may be performed by a human finger or hand via the capacitive sensing.

Figure 8:
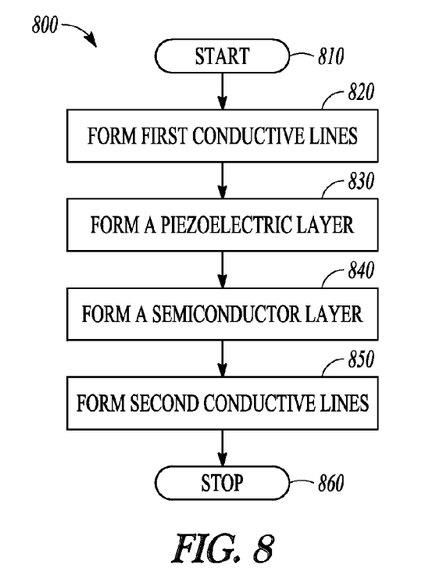
FIG. 8 is a flowchart illustrating a method of forming the example touch sensor of FIG. 1A according to an example embodiment.

FIG. 8 is a flowchart illustrating a method 800 of forming the example touch sensor 100 of FIG. 1A according to an example embodiment. The method starts at 810, and at 820 first conductive lines may be formed on a substrate in a first direction. The first conductive lines may be may be formed by patterning ITO. At 830, a piezoelectric layer may be formed on the first conductive lines. The piezoelectric layer may comprise MN deposited by sputtering. At 840, a semiconductor layer may be formed on the piezoelectric layer. The semiconductor layer may comprise ZnO, InGaZnO, Al(x)In(1−x)N or thin InN and may be deposited by sputtering. At 850, second conductive lines may be formed on the semiconductor layer in a second direction that is substantially orthogonal to the first direction. The second conductive lines may comprise ITO deposited on the semiconductor layer. A dielectric layer may be formed over the second conductive lines and the semiconductor layer. The dielectric layer may comprise silicon dioxide. The method ends at 860.

Figure 9:
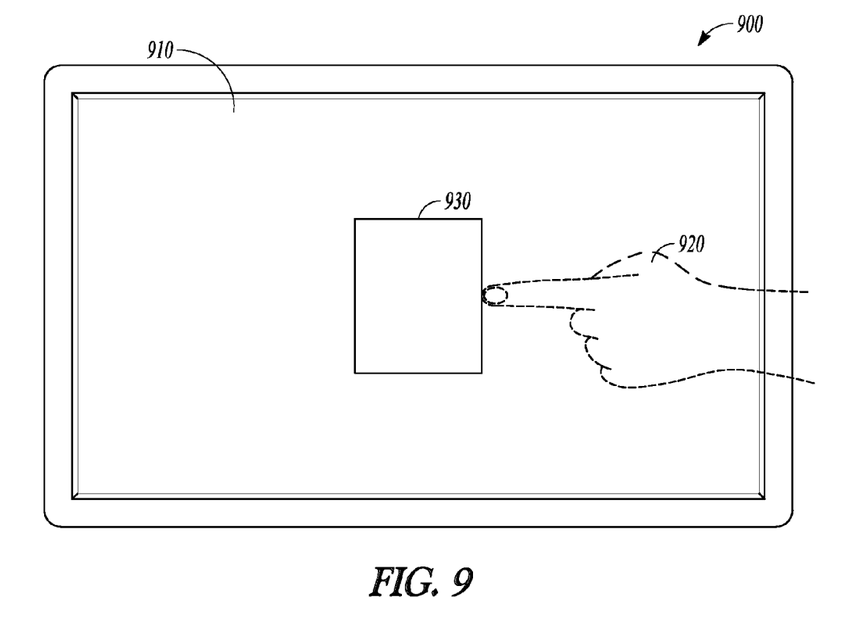
FIG. 9 is a top view of an electronic device with a touch-sensitive display according to an example embodiment.

FIG. 9 is a top view of an electronic device 900 with a touch-sensitive display 910 according to an example embodiment. The touch-sensitive display 910 may include any one of the touch sensors 100, 300 or 500 shown in the figures and described above. The touch-sensitive display 910 may display information including, but not limited to, text, images and videos. A hand 920 or a finger on the hand 920 may be sensed by the touch-sensitive display 910 near an image 930. The electronic device 900 may be a smartphone or a tablet computer.

Embodiments of the invention described and claimed herein are not to be limited in scope by the specific embodiments herein disclosed, since these embodiments are intended as illustration of several aspects of the disclosure. Any equivalent embodiments are intended to be within the scope of this disclosure. Indeed, various modifications of the embodiments of the invention in addition to those shown and described herein will become apparent to those skilled in the art from the foregoing description. Such modifications are also intended to fall within the scope of the appended claims.

All publications, including non-patent literature (e.g., scientific journal articles), patent application publications, and patents mentioned in this specification are incorporated by reference as if each were specifically and individually indicated to be incorporated by reference.

What is claimed is:

1. A touch sensor comprising:
   a substrate;
   a plurality of first conductive lines supported by the substrate;
   a plurality of blocks of piezoelectric material supported by the conductive lines;
   a plurality of blocks of sensing material each supported by a block of the blocks of piezoelectric material;
   one or more electrical contacts each supported by a block of the blocks of sensing material;
   a plurality of second conductive lines respectively electrically connected to an electrical contact of the one or more electrical contacts on a respective block of sensing material on a first conductive line of the conductive lines and electrically connected to an electrical contact of the one or more electrical contacts on another respective block of sensing material on the first conductive line; and
   the sensing material to sense a change in capacitance between the first conductive lines and the second conductive lines when a conductor is located near the first or second conductive lines and the piezoelectric material to sense a force applied to the sensing material;
   wherein the first conductive lines are in a first direction and the second conductive lines are in a second direction substantially orthogonal to the first direction, and the first conductive lines, the second conductive lines and the sensing material define an array of physically separated transistors.

2. The touch sensor of claim 1, wherein:
the piezoelectric layer comprises AlN; and
the semiconductor layer is selected from the group consisting of one or more of ZnO, InGaZnO, Al(x)In(1-x)N and InN, in any combination.

3. The touch sensor of claim 1, wherein the sensing material includes forming material selected from the group consisting of one or more of ZnO, GaN, InN and AlInN, in any combination.

4. The touch sensor of claim 1, wherein:
the plurality of first conductive lines comprises indium tin oxide; and
the plurality of second conductive lines further comprises indium tin oxide.

5. The touch sensor of claim 1, further comprising a dielectric layer over the first conductive lines and the second conductive lines.

6. A method comprising:
forming a plurality of first conductive lines in a first direction on, or at least partially in, a substrate;
forming a plurality of blocks of piezoelectric material on each of the first conductive lines;
forming a block of sensing material on each of the blocks of piezoelectric material;
forming one or more electrical contacts on each block of sensing material;
forming a plurality of second conductive lines in a second direction substantially orthogonal to the first direction, the plurality of second conductive lines respectively electrically connected to an electrical contact of the one or more electrical contacts on a respective block of sensing material on a first conductive line of the conductive lines and electrically connected to an electrical contact of the one or more electrical contacts on another respective block of sensing material on the first conductive line; and
the sensing material to sense a change in capacitance between the first conductive lines and the second conductive lines when a conductor is located near the first or second conductive lines and the piezoelectric material to sense a force applied to the sensing material;
wherein the first conductive lines, the second conductive lines and the sensing material define an array of physically separated transistors.

7. The method of claim 6, wherein forming the sensing material further comprises:
forming the piezoelectric layer comprising AlN; and
forming the semiconductor layer selected from the group consisting of one or more of ZnO, InGaZnO, Al(x)In(1-x)N and InN, in any combination.

8. The method of claim 6, wherein forming the sensing material further comprises forming the sensing material using a material selected from the group including one or more of ZnO, GaN, InN and AlInN, in any combination.

9. The method of claim 6, wherein:
forming the plurality of first conductive lines further comprises forming the plurality of first conductive lines comprising indium tin oxide; and
forming the plurality of second conductive lines further comprises forming the plurality of second conductive lines comprising indium tin oxide.

10. The method of claim 6, further comprising forming a dielectric over the first conductive lines and the second conductive lines.

11. A touch-sensitive display comprising:
a display; and
a touch sensor in the display, the touch sensor comprising:
a substrate;
a plurality of first conductive lines on, or at least partially in, the substrate;
a plurality of blocks of piezoelectric material situated on each of the conductive lines;
a block of sensing material on each of the blocks of piezoelectric material;
one or more electrical contacts on each block of sensing material;
a plurality of second conductive lines respectively electrically connected to an electrical contact of the one or more electrical contacts on a respective block of sensing material on a first conductive line of the conductive lines and electrically connected to an electrical contact of the one or more electrical contacts on another respective block of sensing material on the first conductive line; and
the sensing material to sense a change in capacitance between the first conductive lines and the second conductive lines when a conductor is located near the first or second conductive lines and the piezoelectric material to sense a force applied to the sensing material;
wherein the first conductive lines are in a first direction and the second conductive lines are in a second direction substantially orthogonal to the first direction, and the first conductive lines, the second conductive lines and the sensing material define an array of physically separated transistors.

12. The touch-sensitive display of claim 11, wherein:
the piezoelectric layer comprises AlN; and
the semiconductor layer is selected from the group consisting of one or more of ZnO, InGaZnO, Al(x)In(1-x)N and InN, in any combination.

13. The touch-sensitive display of claim 11, wherein the sensing material includes forming material selected from the group consisting of one or more of ZnO, GaN, InN and AlInN, in any combination.

14. The touch-sensitive display of claim 11, wherein:
the plurality of first conductive lines comprises indium tin oxide; and
the plurality of second conductive lines further comprises indium tin oxide.

* * * * *